United States Patent
Mody et al.

(10) Patent No.: US 11,276,134 B2
(45) Date of Patent: Mar. 15, 2022

(54) RECONFIGURABLE IMAGE PROCESSING HARDWARE PIPELINE

(71) Applicant: TEXAS INSTRUMENTS INCORPORATED, Dallas, TX (US)

(72) Inventors: Mihir Narendra Mody, Bengaluru (IN); Niraj Nandan, Plano, TX (US); Rajat Sagar, Allen, TX (US); Shashank Dabral, Allen, TX (US); Anthony Lell, San Antonio, TX (US); Brijesh Jadav, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/847,864

(22) Filed: Apr. 14, 2020

(65) Prior Publication Data

US 2021/0209719 A1    Jul. 8, 2021

Related U.S. Application Data

(60) Provisional application No. 62/956,381, filed on Jan. 2, 2020.

(51) Int. Cl.
*G06T 5/40* (2006.01)
*G06T 1/20* (2006.01)
(Continued)

(52) U.S. Cl.
CPC ............ *G06T 1/20* (2013.01); *G06T 1/60* (2013.01); *G06T 5/008* (2013.01); *G06T 5/40* (2013.01); *G06T 2207/30252* (2013.01)

(58) Field of Classification Search
CPC ......... G09G 2320/103; G09G 2320/10; G09G 2360/16
See application file for complete search history.

(56) References Cited

U.S. PATENT DOCUMENTS

| 7,620,265 B1 | 11/2009 | Wolff et al. |
| 8,488,055 B2 * | 7/2013 | Cote ............ H04N 5/228 348/371 |

(Continued)

FOREIGN PATENT DOCUMENTS

CN      106886985 A      6/2017

OTHER PUBLICATIONS

Notification of Transmittal of the International Search Report and the Written Opinion of the International Searching Authority, or the Declaration; PCT/US2020/067218; dated Apr. 2, 2021, 8 pages.

*Primary Examiner* — Antonio A Caschera
(74) *Attorney, Agent, or Firm* — Ebby Abraham; Charles A. Brill; Frank D. Cimino (57) ABSTRACT

A reconfigurable image processing pipeline includes an image signal processor (ISP), a control processor, and a local memory. ISP processes raw pixel data for a frame based on an image processing parameter and provides lines of processed pixel data to control processor via a first interface. For each region of interest (ROI) in the frame, ISP generates auto-exposure and auto-white balance (2A) statistics based on the lines for the ROI and writes them to the local memory via a second interface. Control processor reads 2A statistics from the local memory, determines the image processing parameter based on them, and provides the image processing parameter to ISP. ISP also generates an integer N bin histogram for control processor, which sums a portion of the N total bins and compares the summed bin count to a lighting transition threshold. The image processing parameter is further based on the comparison.

17 Claims, 5 Drawing Sheets

(51) Int. Cl.
     *G06T 1/60*         (2006.01)
     *G06T 5/00*         (2006.01)

(56) References Cited

U.S. PATENT DOCUMENTS

| | | |
|---|---|---|
| 9,871,965 B2 | 1/2018 | Dabral et al. |
| 9,986,171 B2 * | 5/2018 | Yoon .................. H04N 5/35554 |
| 10,798,322 B2 * | 10/2020 | Smith ................ H04N 5/35554 |
| 2007/0154089 A1 | 7/2007 | Kao |
| 2008/0310714 A1 | 12/2008 | Stern et al. |
| 2018/0082454 A1 | 3/2018 | Sahu et al. |
| 2020/0329964 A1 * | 10/2020 | Shiue .................. A61B 5/0077 |

* cited by examiner

RECONFIGURABLE IMAGE PROCESSING HARDWARE PIPELINE

This application claims priority to U.S. Provisional Application No. 62/956,381, filed Jan. 2, 2020, which is hereby incorporated by reference.

BACKGROUND

Image processing hardware pipelines must be able to quickly update image processing parameters such as tone mapping look-up tables (LUTs) and gain in response to fast-changing environments. For example, some driver assistance systems use image processing to map the environment around a car. When the car enters a tunnel, the environment suddenly becomes much darker, lit by artificial lighting. The image processing hardware pipeline must be able to quickly adjust the appropriate parameters to maintain the driver assistance system's performance under the darker environmental conditions. When the car exits the tunnel and the environment suddenly becomes much brighter, the image processing hardware pipeline must quickly return to its previous configuration.

Some image processing hardware pipelines update image processing parameters by reading statuses and statistics from a memory map register, performing auto-exposure and auto-white balance corrections, and writing updated parameters to the necessary registers. However, this process may take too long for some implementations. The read and write steps often use a relatively slow communications bus and are high latency. In some examples, the read and write steps are as slow as 200 nanoseconds (ns) per 32 bit word. The auto-exposure and auto-white balance corrections may also be slow to perform, depending on the algorithm complexity.

The image processing hardware pipelines update parameters in an on-the-fly mode or in a memory-to-memory mode. In the on-the-fly mode, the image processing pipeline reconfigures parameters during short vertical blanking periods at the end of a frame of image data. To reconfigure parameters in these shorter time periods, the image processing pipeline selects a limited number of parameters to update, called critical parameters. Non-critical parameters are assumed to stay largely the same from one frame to another and are not updated. The image processing pipeline implements the updated parameters with one frame of latency. In the memory-to-memory mode, the image processing pipeline reconfigures all parameters towards the end of the frame, slowing the effective processing throughput. Frame latency or overall reduced throughput are unacceptable in some applications for image processing hardware pipelines, such as driving assistance systems.

SUMMARY

A system for reconfiguration of an image processing hardware pipeline includes an image signal processor (ISP), a control processor, and a local memory. The ISP is configured to obtain image signals comprising raw pixel data for a frame and process the raw pixel data based on at least one image processing parameter to obtain lines of processed pixel data for the frame. For each region of interest in the frame, the ISP is configured to generate auto-exposure and auto-white balance (2A) statistics based on the lines of processed pixel data for the region of interest and write the 2A statistics to the local memory via a first interface. The ISP is configured to provide the lines of processed pixel data for the frame to the control processor via a second interface. The control processor is configured to read the 2A statistics from the local memory, determine the at least one image processing parameter based on the 2A statistics, and provide the at least one image processing parameter to the ISP.

In some implementations, the ISP is further configured to generate an N-bin histogram based on the processed pixel data for the frame, where N is an integer, and provide the N-bin histogram to the control processor. The control processor is further configured to sum a portion of the N total bins of the histogram for a summed bin count, compare the summed bin count to a lighting transition threshold, and determine, based on the comparison, the at least one image processing parameter. The ISP can provide the N-bin histogram to the control processor via the second interface by appending the N-bin histogram to the lines of processed pixel data.

In some implementations, the system further comprises a look up table (LUT) logic unit comprising a plurality of tone mapping LUTs and a selector logic circuit configured to output a selected tone mapping LUT from the plurality of tone mapping LUTs based on the at least one image processing parameter. The at least one image processing parameter comprises an indicator of the selected tone mapping LUT. The control processor is further configured to select a first tone mapping LUT in response to the summed bin count being less than the lighting transition threshold and select a second tone mapping LUT in response to the summed bin count being greater than the lighting transition threshold.

In some implementations, the plurality of tone mapping LUTs are included in a decompanding signal processing channel for a wide dynamic range operating mode for the system. The control processor can be further configured to generate the plurality of tone mapping LUTs in response to the wide dynamic range operating mode not being used and provide the plurality of tone mapping LUTs to the ISP. The ISP can be further configured to store the tone mapping LUTs from the control processor and reconfigure the plurality of tone mapping LUTs from the decompanding signal processing channel to the LUT logic unit.

In some examples, the first tone mapping LUT is a daylight tone mapping LUT, and the second tone mapping LUT is a nighttime tone mapping LUT. The lighting transition threshold can comprise a daylight threshold and a nighttime threshold. The control processor then selects the daylight tone mapping LUT in response to the summed bin count being less than the nighttime threshold and selects the nighttime tone mapping LUT in response to the summed bin count being greater than the daylight threshold.

BRIEF DESCRIPTION OF THE DRAWINGS

For a detailed description of various examples, reference will now be made to the accompanying drawings in which.

DETAILED DESCRIPTION

In the disclosed systems and methods of reconfiguring an image processing pipeline, an image signal processor (ISP) calculates auto-exposure and auto-white balance (2A) statistics in parallel with processing raw pixel data and makes use of a first communication interface to store the 2A statistics in a local memory and a second communication interface to provide the processed pixel data to a control processor. The control processor is able to read the 2A statistics from the local memory more quickly than from other memory in the system or over a communication interface for configurations.

The ISP also calculates an N bin histogram for the processed pixel data and provides it to the control processor in one of a number of possible methods: over the communication interface for the processed pixel data, by storing it in the local memory, by storing it in the other memory in the system, and the like. N is an integer. The control processor sums the bin count for a portion of the N total bins of the histogram and compares the summed bin count to a lighting transition threshold. Based on the comparison and the 2A statistics, the control processor determines at least one updated configuration parameter for the ISP to use in processing other raw pixel data, and provides it to the ISP over the communication interface for configurations.

Figure 1:
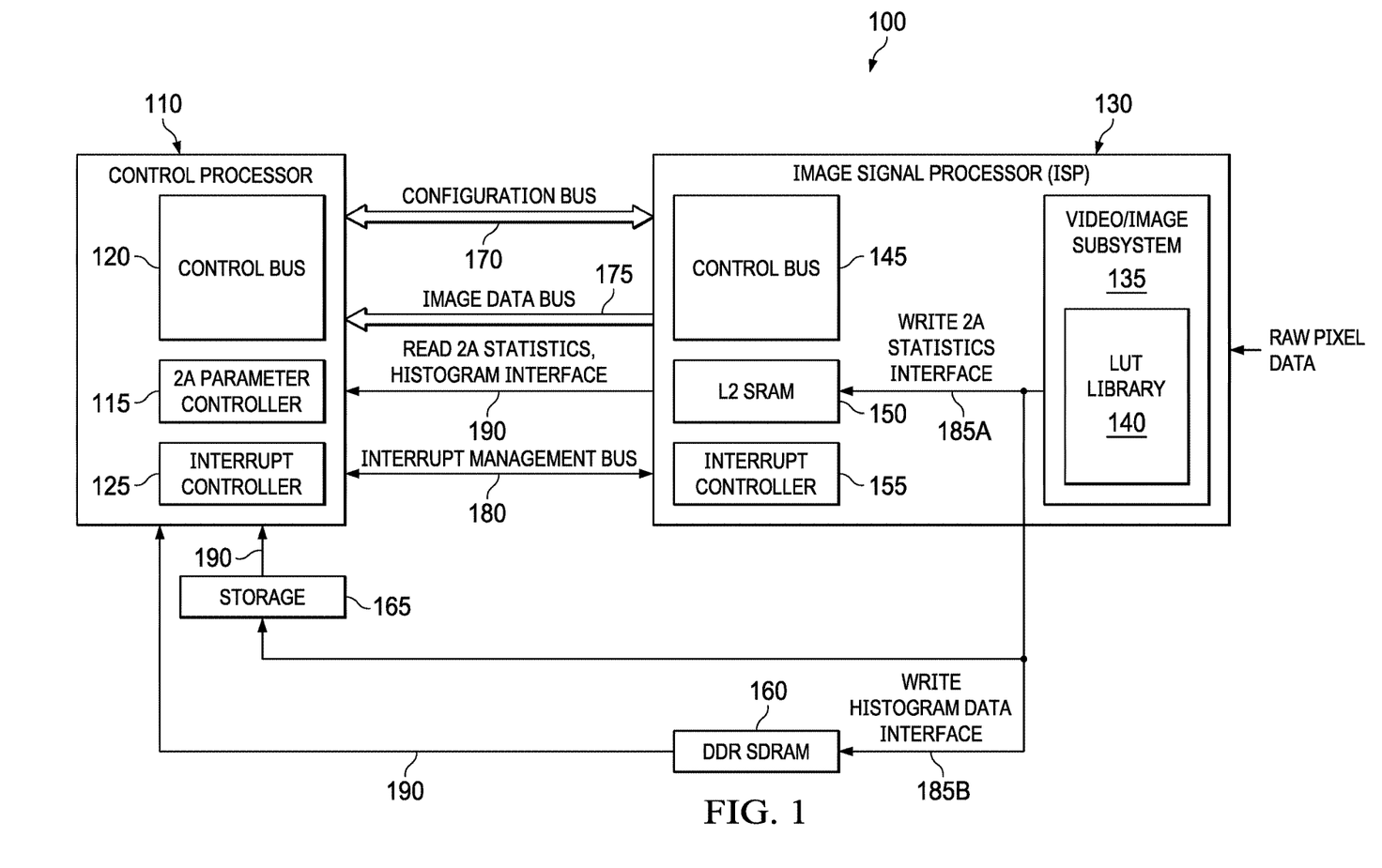
FIG. 1 illustrates a block diagram of an image processing system.

FIG. 1 illustrates a block diagram of an image processing system. The image processing system 100 includes a control processor 110, an image signal processor (ISP) 130, a double data rate (DDR) synchronous dynamic random access memory (SDRAM) 160, and storage 165. Storage 165 may be used to store instructions and data, and may be any appropriate storage medium such as a static random access memory (SRAM). Control processor 110 includes an auto-exposure and auto-white balance (2A) parameter controller 115, a control bus 120, and an interrupt controller 125. ISP 130 includes a video/image subsystem 135, a control bus 145, a level two (L2) SRAM 150, and an interrupt controller 155. Interrupt controllers 125 and 155 in control processor 110 and ISP 130 respectively send, receive, and manage interrupts over an interrupt management bus 180.

ISP 130 receives raw pixel data from a sensor, such as from a camera, and video/image subsystem 135 processes the raw pixel data based on configuration parameters from control processor 110. For example, the video/image subsystem 135 performs tone mapping on the raw pixel data based on a tone mapping curve look up table (LUT) from LUT library 140. ISP 130 provides the processed pixel data to control processor 110 over image data bus 175. In some implementations, ISP 130 stores the processed pixel data in DDR SDRAM 160 or storage 165.

As it processes the raw pixel data, video/image subsystem 135 generates 2A statistics for regions of interest 220 in the pixel data and stores the 2A statistics to L2 SRAM 150 over an interface 185A for writing 2A statistics, distinct from the image data bus 175. Control processor 110 reads the 2A statistics from L2 SRAM 150 over an interface 190 for reading the 2A statistics, distinct from the image data bus 175 and configuration bus 170. In some embodiments, video/image subsystem 135 provides the 2A statistics directly to control processor 110 over the interface 185A for writing 2A statistics.

After the raw pixel data for the frame is processed, ISP 130 converts the processed pixel data into the log domain after linearization and generates a histogram. ISP 130 writes the histogram data to L2 SRAM 150, DDR SDRAM 160, and/or storage 165 over an interface 185B for writing the histogram. The interface 185B for writing the histogram may be the same as or a distinct interface from the interface 185A for writing 2A statistics. In some embodiments, ISP 130 provides the histogram data directly to control processor 110 over the image data bus 175. ISP 130 can write the histogram and the 2A statistics to the same or to different storages. Control processor 110 reads the histogram from L2 SRAM 150, DDR SDRAM 160, and/or storage 165 over an interface 190 for reading the 2A statistics and histogram, over the image data bus 175, or over the configuration bus 170.

2A parameter controller 115 determines updated image processing parameters for ISP 130 to use in processing the raw pixel data under the current environmental conditions based on the 2A statistics and the histogram and provides the updated parameters to ISP 130 over configuration bus 170. Because video/image subsystem 135 calculates and writes 2A statistics in parallel with the processed pixel data and via a distinct interface 185A for writing the 2A statistics rather than over the image data bus 175, control processor 110 is able to access the 2A statistics from the L2 SRAM 150 more quickly. In addition, video/image subsystem 135 writes the 2A statistics to a low latency L2 SRAM 150, which control processor 110 is able to read more quickly from DDR SDRAM 160 or over configuration bus 170.

Figure 2:
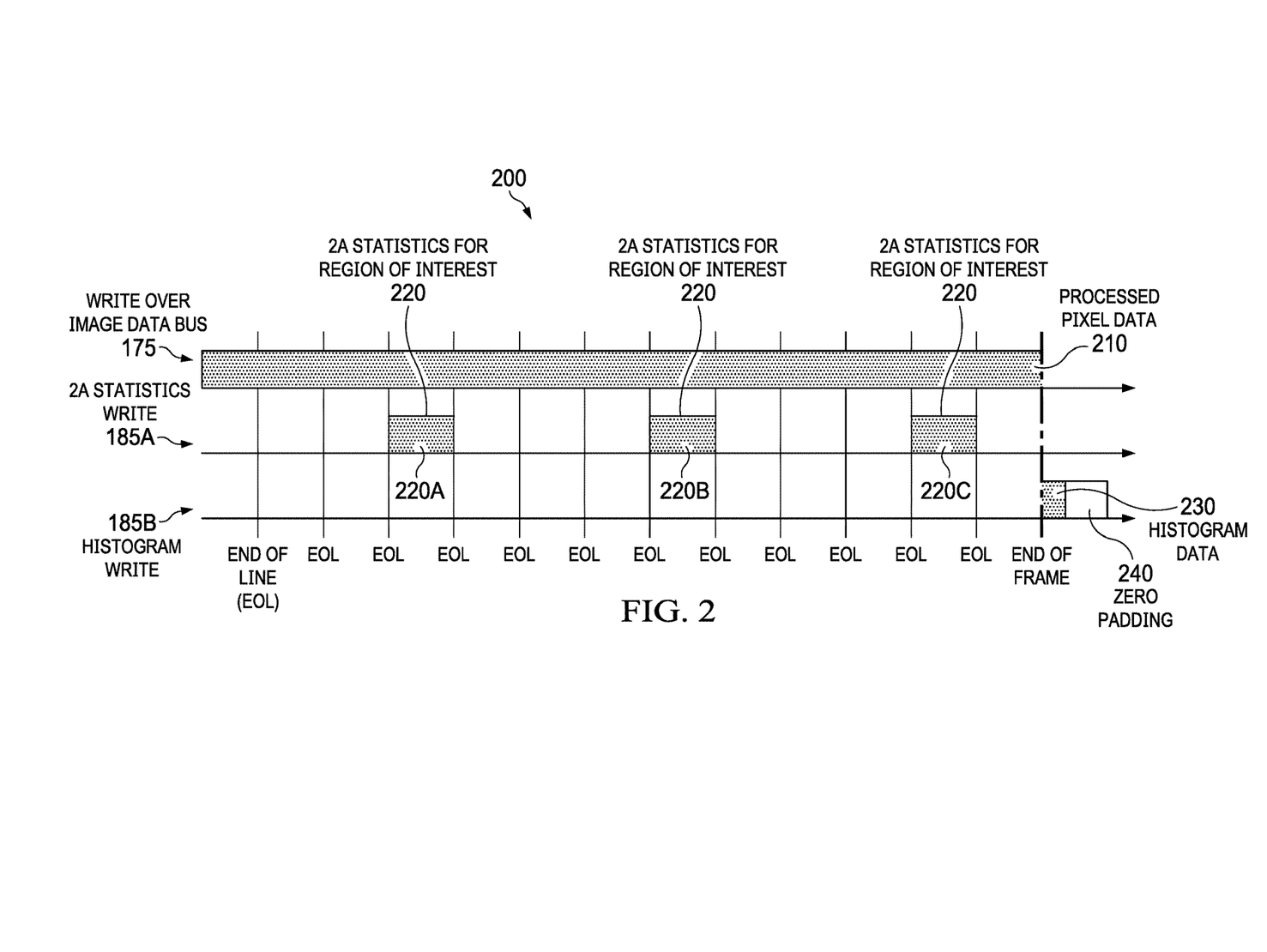
FIG. 2 shows a timing diagram illustrating how an image processing system writes pixel data and statistics to one or more memories.

FIG. 2 shows a diagram 200 illustrating how an image processing system writes pixel data and statistics to one or more memories. Processed pixel data 210 is written by line over image data bus 175 by ISP 130. 2A statistics 220A-C are calculated for regions of interest and written over the dedicated interface 185A to L2 SRAM 150. Because the 2A statistics 220A-C are calculated for regions of interest, rather than for each line, the 2A statistics 220A-C are written at intervals. ISP 130 calculates the histogram data 230 based on all pixel data 210 for the frame, after ISP 130 has finished processing the raw pixel data for the frame. ISP 130 writes the histogram data 230 to L2 SRAM 150, DDR SDRAM 160, and/or storage 165 over the interface 185B, which can be the same as or different from the interface 185A for the 2A statistics, or provides the histogram data 230 directly to control processor 110 over image data bus 175. Histogram data 230 may be appended with zero-padding 240 to be the same size as a line of pixel data 210.

Figure 3:
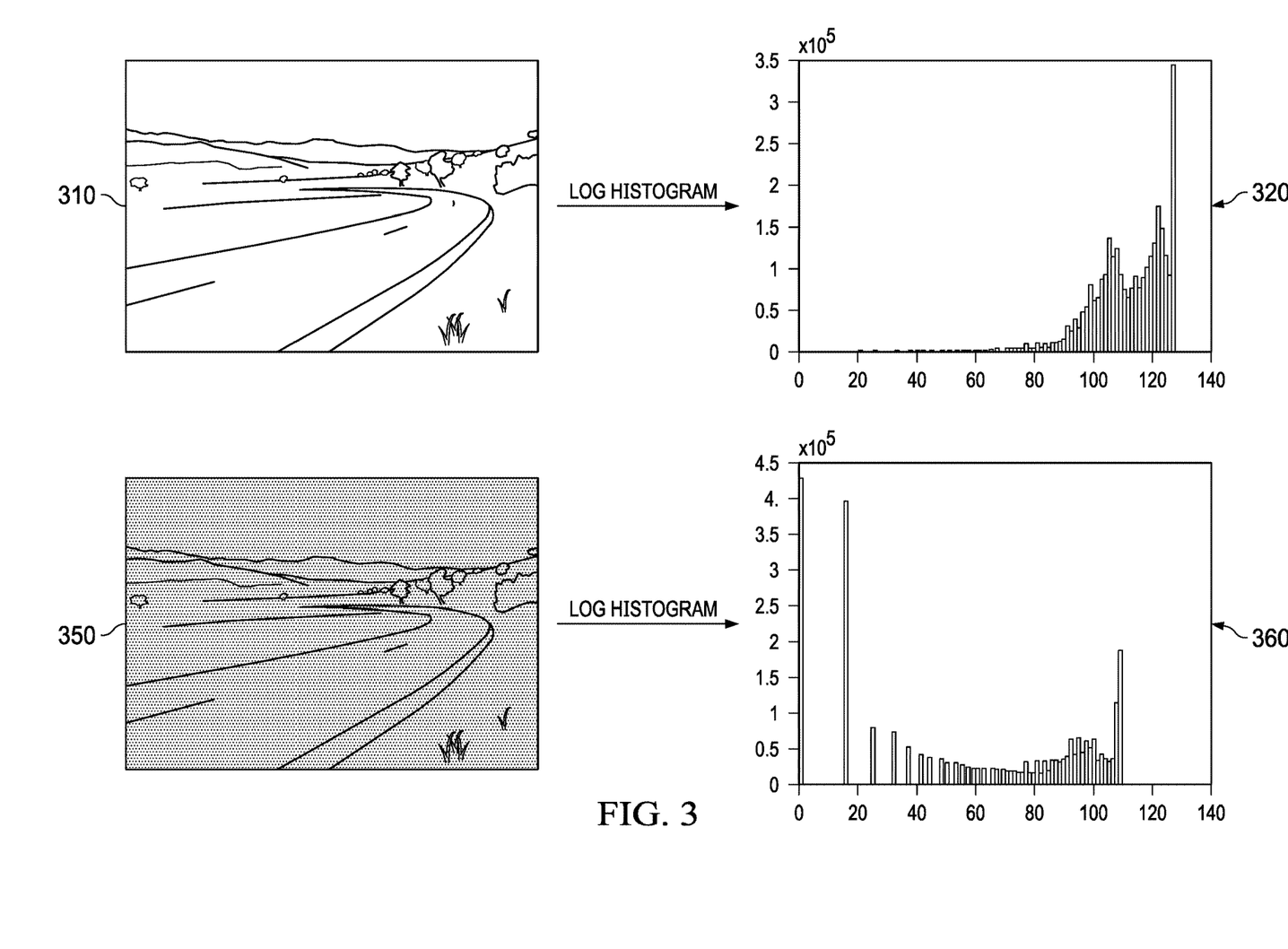
FIG. 3 shows two example images of an environment and the corresponding histograms.

FIG. 3 shows two example images of an environment and the corresponding histograms. As described previously herein, ISP 130 converts the processed pixel data into the log domain after linearization and generates an N bin histogram. N is an integer. Image 310 shows a daytime image, for example from a camera in a driver assistance system. Graph 320 shows an example 128 bin histogram corresponding to image 310. Similarly, image 350 shows a nighttime image, and graph 360 shows the corresponding 128 bin histogram. As graphs 320 and 360 show, the histogram for daytime image 310 includes higher counts in the bins corresponding to brighter tones than the histogram for nighttime image 350, which includes higher counts in the bins corresponding to dimmer tones. The differing bin counts provide a metric for control processor 110 to use in determining the updated image processing parameters for ISP 130 to use under the current environmental conditions.

Figure 4:
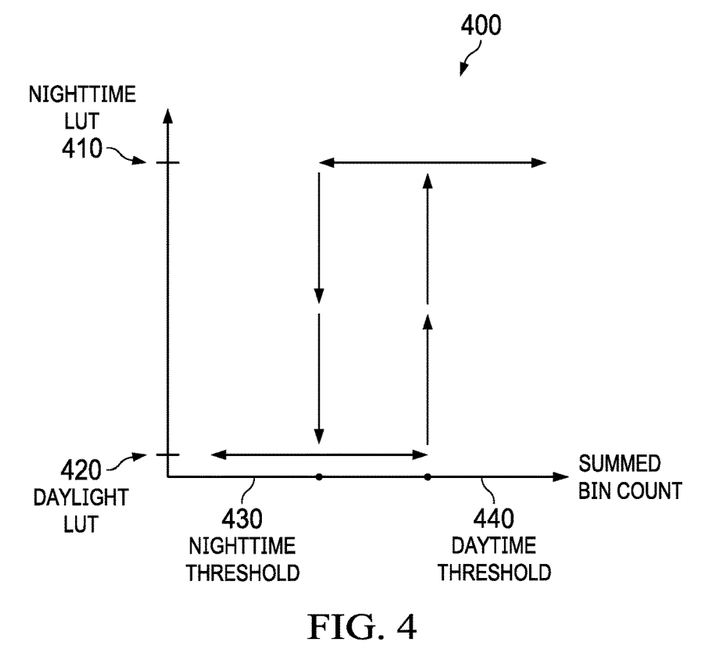
FIG. 4 shows a graph of example lighting transition thresholds.

FIG. 4 shows a graph 400 of example lighting transition thresholds. Control processor 110 reads the histogram data for the processed pixel data from L2 SRAM 150, DDR SDRAM 160, and/or storage 165 over the interface 190 for reading the 2A statistics and histogram data, over the image data bus 175, or over the configuration bus 170. Control processor 110 sums the first M of the N bins in the histogram and compares the summed bin count to a predetermined threshold. The integer number M of bins to be summed and the predetermined threshold can be chosen based on the analog gain applied to the raw pixel data and the exposure time of the camera, for example. In the example of FIG. 3 and the histograms shown in graphs 320 and 360, the control processor 110 sums the first 64 of the 128 total bins. The summed bin count being less than the predetermined threshold is indicative of brighter environmental conditions. The summed bin count being greater than the predetermined threshold is indicative of darker environmental conditions.

The graph 400 shows the summed bin count for the first M of the N bins of the histograms alongside which tone mapping LUT 2A parameter controller 115 determines is appropriate under the current environmental conditions. The graph 400 shows two predetermined thresholds: a nighttime threshold 430 and a daytime threshold 440. In response to the summed bin count increasing above the daytime threshold 440, control processor 110 indicates that ISP 130 should use a nighttime LUT 410 while processing the raw pixel data. In response to the summed bin count being less than the nighttime threshold 430, control processor 110 indicates the ISP 130 should use a daylight LUT 420 while processing the raw pixel data. LUTs 410 and 420 can be stored in LUT library 140, and control processor 110 indicates which LUT from LUT library 140 the ISP 130 should use, rather than providing the entire LUT to ISP 130 over configuration bus 170. The LUTs in LUT library 140 can be programmed upfront by control processor 110 to accommodate different environmental conditions.

In this example, both a nighttime threshold 430 and a daytime threshold 440 are used to implement hysteresis and prevent rapid oscillation between LUTs 410 and 420 in response to environmental conditions transitioning from brighter to darker and vice versa, such as in the evenings and early mornings. For example, the nighttime threshold 430 corresponds to a summed bin count of 23,000, while the daytime threshold 440 corresponds to a summed bin count of 1.3 million. In the example of the 128 bin histogram and summing 64 of the 128 bins, control processor 110 performs 64 additions and two multiplications, which allows control processor 110 to quickly determine environmental lighting conditions and select the appropriate LUT.

Figure 5:
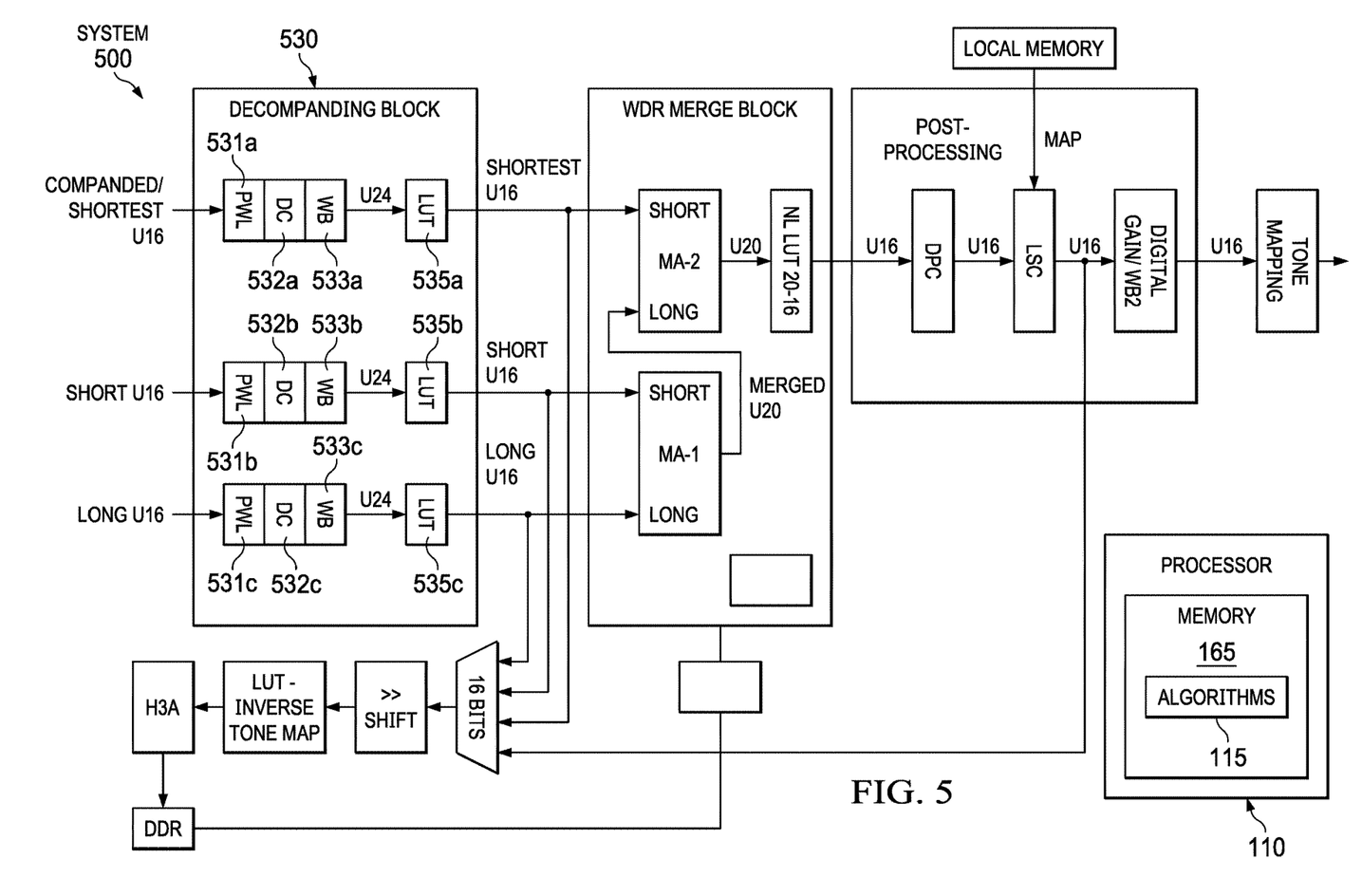
FIG. 5 illustrates a block diagram of a simplified signal processing chain.

FIG. 5 illustrates a block diagram of an example wide dynamic range (WDR) image processing system 500. The image processing system 500 is fully described in U.S. Pat. No. 9,871,965 to Dabral, et al., and receives raw image pixel data in a plurality of frames having a plurality of different exposure times, shown as shortest, short, and long exposure time frames. Decompanding block 530 is used for processing pixel data received from companding WDR sensors which merge data on the sensor and compress it down. Decompanding block 530 includes a processing channel for each of the shortest, short, and long exposure time frames. Each processing channel includes a piece-wise linear (PWL) block 531a-c for decompanding, a DC block 532a-c for subtracting a constant from the intensity value of each pixel, a white balance (WB) correction block 533a-c, and an LUT 535a-c.

Figure 6:
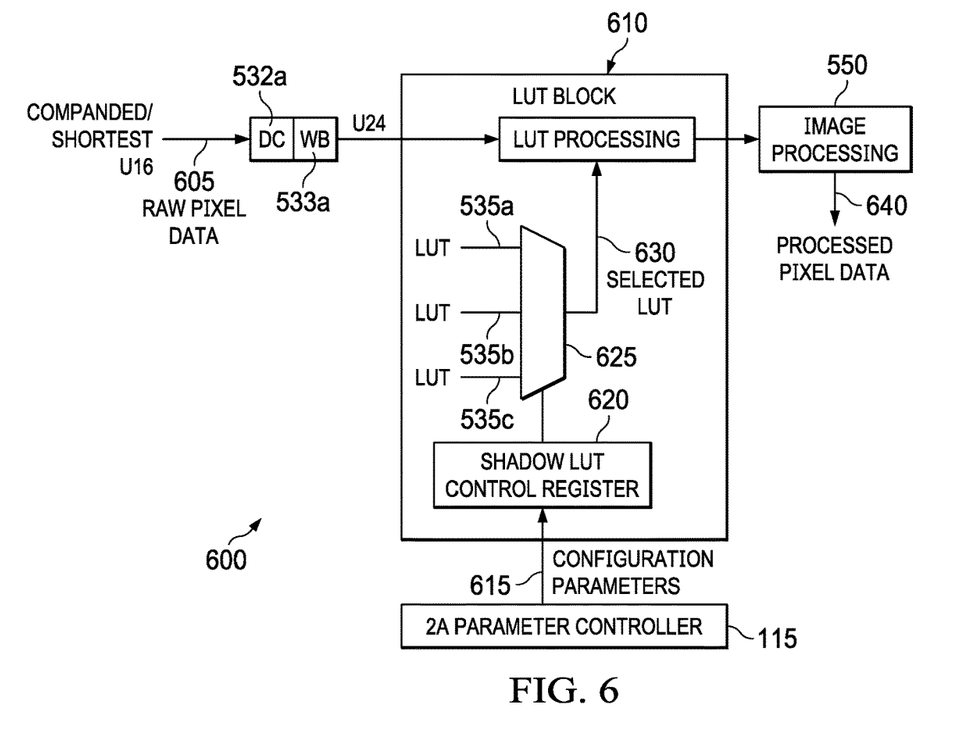
FIG. 6 illustrates a block diagram of the reconfigured simplified signal processing chain shown in FIG. 5.

For raw pixel data 605 from other kinds of sensors or while operating in modes other than WDR operating mode, system 500 reconfigures decompanding block 530 for processing data through the shortest time frame signal channel only, as shown in FIG. 6. The reconfigured system 600 bypasses the PWL 531a and repurposes LUTs 535a-c to store tone mapping LUTs for different environmental conditions, such as the nighttime LUT 410 and daylight LUT 420 described herein with reference to FIG. 4, acting as LUT library 140 described herein with reference to FIG. 1. LUT block 610 includes a shadow LUT control register 620 and a selector logic circuit 625. In this example, selector logic circuit 625 is a multiplexor, but any appropriate selector logic circuit may be used. Shadow LUT control register 620 stores a configuration parameter 615 from 2A parameter controller 115, which indicates which LUT 535a-c mux 625 should output. The selected LUT 630 output by mux 625 is used for LUT processing. Reconfigured system 600 performs other image processing such as defective pixel correct, lens shading correction, gain, and the like at 550, and outputs processed pixel data 640.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method, comprising:
  receiving, by an image signal processor (ISP), image signals comprising raw pixel data;
  processing, by the ISP and based on at least one image processing parameter, the raw pixel data to obtain processed pixel data;
  generating, by the ISP, an N-bin histogram based on the processed pixel data, wherein N is an integer greater than 0;
  providing, by the ISP, the N-bin histogram to a control processor;
  summing, by the control processor, a portion of the N total bins of the histogram for a summed bin count;
  comparing, by the control processor, the summed bin count to a lighting transition threshold;
  determining, by the control processor and based on the comparison, at least one updated image processing parameter; and
  providing, by the control processor, the at least one updated image processing parameter to the ISP.

2. The method of claim 1, wherein the processed pixel data comprises multiple regions of interest, the method further comprising iteratively, for each region of interest:
  generating, by the ISP, auto-exposure and auto-white balance (2A) statistics based on the processed pixel data for the region of interest;
  writing, by the ISP, the 2A statistics to a local memory via a first interface; and
  providing, by the ISP, lines of the processed pixel data for the region of interest to the control processor via a second interface.

3. The method of claim 2, wherein the local memory comprises a level 2 static random access memory.

4. The method of claim 2, further comprising reading, by the control processor, the 2A statistics from the local memory, wherein determining the at least one updated image processing parameter is further based on the 2A statistics.

5. The method of claim 2, further comprising providing, by the ISP, a line of histogram data to the control processor via the second interface, wherein the line of histogram data is appended to the lines of processed pixel data.

6. The method of claim 5, wherein the line of histogram data is zero padded to a predetermined length.

7. The method of claim 1, wherein the at least one image processing parameter comprises a tone mapping look up table (LUT), the method further comprising:
   generating, by the control processor, a first tone mapping LUT and a second tone mapping LUT; and
   providing, by the control processor, the first and second tone mapping LUTs to the ISP, wherein determining the at least one updated image processing parameter comprises:
      in response to the summed bin count being less than the lighting transition threshold, selecting the first tone mapping LUT, and
      in response to the summed bin count being greater than the lighting transition threshold, selecting the second tone mapping LUT, wherein the at least one updated image processing parameter comprises an indicator of the selected tone mapping LUT.

8. The method of claim 7, wherein the first tone mapping LUT is a daylight tone mapping LUT, and wherein the second tone mapping LUT is a nighttime tone mapping LUT.

9. The method of claim 8, wherein the lighting transition threshold comprises a daylight threshold and a nighttime threshold, and wherein determining the at least one updated image processing parameter comprises:
   in response to the summed bin count being less than the nighttime threshold, selecting the daylight tone mapping LUT, and
   in response to the summed bin count being greater than the daylight threshold, selecting the nighttime tone mapping LUT.

10. A system, comprising:
   an image signal processor (ISP), configured to:
      obtain image signals comprising raw pixel data for a frame;
      process the raw pixel data based on at least one image processing parameter to obtain lines of processed pixel data for the frame;
      for each region of interest in the frame:
         generate auto-exposure and auto-white balance (2A) statistics based on the lines of processed pixel data for the region of interest;
         write the 2A statistics to a local memory via a first interface; and
         provide the lines of processed pixel data for the frame to a control processor via a second interface; and
   the control processor, configured to:
      read the 2A statistics from the local memory;
      determine the at least one image processing parameter based on the 2A statistics; and
      provide the at least one image processing parameter to the ISP.

11. The system of claim 10, wherein the ISP is further configured to:
   generate an N-bin histogram based on the processed pixel data for the frame, wherein N is an integer greater than 0;
   provide the N-bin histogram to the control processor;
   wherein the control processor is further configured to:
   sum a portion of the N total bins of the histogram for a summed bin count;
   compare the summed bin count to a lighting transition threshold; and
   determine, based on the comparison, the at least one image processing parameter.

12. The system of claim 11, wherein the ISP is further configured to provide the N-bin histogram to the control processor via the second interface, wherein a line of histogram data comprising the N-bin histogram is appended to the lines of processed pixel data.

13. The system of claim 11, further comprising a look up table (LUT) logic unit, wherein the LUT logic unit comprises:
   a plurality of tone mapping LUTs;
   a selector logic circuit configured to output a selected tone mapping LUT from the plurality of tone mapping LUTs based on the at least one image processing parameter, wherein the at least one image processing parameter comprises an indicator of the selected tone mapping LUT, and wherein the control processor is further configured to:
   select a first tone mapping LUT in response to the summed bin count being less than the lighting transition threshold; and
   select a second tone mapping LUT in response to the summed bin count being greater than the lighting transition threshold.

14. The system of claim 13, wherein the plurality of tone mapping LUTs are included in a decompanding signal processing channel for a wide dynamic range operating mode for the system.

15. The system of claim 14, wherein the control processor is further configured to:
   in response to the wide dynamic range operating mode not being used, generate the plurality of tone mapping LUTs; and
   provide the plurality of tone mapping LUTs to the ISP, wherein the ISP is further configured to:
   store the tone mapping LUTs from the control processor; and
   reconfigure the plurality of tone mapping LUTs from the decompanding signal processing channel to the LUT logic unit.

16. The system of claim 13, wherein the first tone mapping LUT is a daylight tone mapping LUT, and wherein the second tone mapping LUT is a nighttime tone mapping LUT.

17. The system of claim 16, wherein the lighting transition threshold comprises a daylight threshold and a nighttime threshold, and wherein the control processor is further configured to:
   select the daylight tone mapping LUT in response to the summed bin count being less than the nighttime threshold, and
   select the nighttime tone mapping LUT in response to the summed bin count being greater than the daylight threshold.

* * * * *